United States Patent Office 3,415,902
Patented Dec. 10, 1968

3,415,902
RESIN-PROVIDING COMPOSITIONS COMPRISING A REACTION PRODUCT OF AN EPIHALOHYDRIN POLYMER AND A MERCAPTO-ALKANOL
Richard A. Hickner and Hugh A. Farber, Midland, Mich., assignors to The Dow Chemical Company, Midland, Mich., a corporation of Delaware
No Drawing. Continuation-in-part of application Ser. No. 407,578, Oct. 29, 1964. This application July 12, 1967, Ser. No. 652,732
11 Claims. (Cl. 260—849)

ABSTRACT OF THE DISCLOSURE

A resinous material is produced by reacting in an inert diluent a mercapto-alkanol with epihalohydrin polymers such as epihalohydrin homopolymers or epihalohydrin copolymers with an alkylene oxide in the presence of an alkali metal hydoxide wherein the mercapto-alkanol has the structure

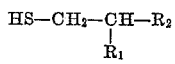

at least one hydroxyl group being present on $R_1$ or $R_2$. The products of the reaction are useful as resin intermediates. The epichlorohydrin copolymer-mercapto alkanol products are useful as protective colloids for water soluble resins. They can be reacted with melamine to produce termoset resins and they can be reacted with polyisocyanates to produce polyurethane resins and foams.

---

This application is a continuation-in-part of application S.N. 407,578 filed Oct. 29, 1964, now abandoned.

This invention relates to a new resinous material consisting of the reaction product of an epihalohydrin polymer or copolymer and a mercapto-alkanol.

The homopolymerization of an epihalohydrin or its copolymerization with alkylene oxides, is well known to the art. The homo- or copolymerization of epihalohydrin is generally initiated by traces of water, glycerol or other polyfunctional compounds which are either incidently present in the epihalohydrin or are deliberately added for that purpose. The polymerization reaction can be catalyzed by a Friedel-Crafts catalyst such as $BF_3$ etherate. The resulting polymers may either be homopolymers, random copolymers or block copolymers which correspond substantially to the structural formula

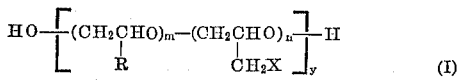

wherein R is hydrogen, a lower alkyl group containing from 1 to 4 carbon atoms, a phenoxymethyl group and an alkyl substituted phenoxy methyl group wherein the alkyl groups contain from 1 to 12 carbon atoms, $m$ may be 1 or may vary in different reaction products from 0 to more than 1, $n$ is one or more, $y$ is one or more, and X is halogen, usually chlorine, bromine or iodine.

It is to be understood that the homo- or copolymer chain may contain a poly functional radical derived from the poly functional compound which may be used as an initiator for the polymerization. Since the initiator ordinarily constitutes only a very minor part of the polymer chain, its identity has little or no significant influence on the properties of the polymer.

The molecular weight of the epihalohydin homopolymer or copolymer prepared with a Friedel-Crafts type catalyst will generally vary from a few hundred to several thousand. If extremely high molecular weights i.e. above 100,000 are desired, the polymers can be prepared with the aid of a metal alkyl catalyst such as triethyl aluminum or a $FeCl_3$ propylene oxide complex as described in U.S. 2,706,189.

It may be seen from the above Formula I that the epihalohydrin homo- or copolymer is a polyhaloglycol having pendant halogenated alkyl groups attached to the polymer chain. These halogenated alkyl groups are reacted with mercapto-alkanols represented by the formula

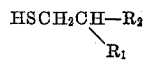

wherein $R_1$ is hydrogen or an hydroxyl group, $R_2$ is hydrogen, an alkyl group containing 1 to 4 carbon atoms, a hydroxy methyl group, an alkoxymethyl group containing 1 to 18 carbon atoms, and an alkylthiomethyl group containing 1 to 18 carbon atoms, with the proviso that at least one of $R_1$ and $R_2$ are hydroxy groups to prepare the compositions of the present invention, which correspond substantially to the formula

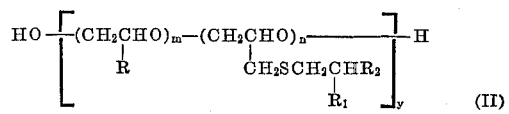

where R, $R_1$, $R_2$, $m$, $n$ and $y$ are as above defined. As aforementioned, the composition may additionally contain a minor amount of the residue of a poly functional compound used to initiate the polymerization of the epihalohydrin polymer.

Epihalohydrins used in preparing the aforesaid epihalohydrin polymers and copolymers of the present invention include epichlorohydrin, epibromohydrin and epiiodohydrin. In view of its availability and low cost epichlorohydrin is preferred.

Alkylene oxides which may be reacted with epihalohydrin to prepare the epihalohydrin copolymers of the present invention are ethylene oxide, propylene oxide, butylene oxide, isobutylene oxide, phenyl glycidyl ether, butylglycidyl ether, octadecyglycidyl ether, trimethylene oxide, tertahydrofuran and the like.

Catalysts which may be employed to prepare the epihalohydrin polymers of the present invention include those of the Friedel-Crafts type, including androus $AlCl_3$, $BF_3$, $ZnCl_2$, $FeCl_3$, $SnCl_4$, and complexes such as the well known $BF_3$ etherates, etc. and acid type catalysts including HF, $H_2SO_4$, $H_3PO_4$, $H_3PO_2$ and the like, and combinations thereof.

The concentration of catalyst may be varied, depending upon the individual catalyst. For example, from about 0.01 percent to about 2 percent of $BF_3$ or a complex thereof, based upon the total quantity of reactants, provide satisfactory results. Generally, from about 0.05 to about 0.5 percent by weight based on the weight of the reactants is preferred.

Suitable poly functional initiating compounds for the polymerization reaction include water, ethylene glycol, diethylene glycol, 1,2-proylene glycol, 1,6-hexanediol, glycerol, sucrose and the like.

In making the products of the present invention the epihalohydrin polymer or copolymer is first prepared by charging the monomer or mixture of monomers together with the catalyst, and if required, a suitable poly functional intiator, into a closed reaction vessel and the heat of reaction maintained at 20° to 60° C., preferably at 40° to 60° C., until polymerization is complete. Advantageously, the catalyst and initiator, is added to the reaction vessel first and the monomer or mixture of monomers is slowly added to the reaction vessel over a period of time depending on the quantity charged accompanied with the addition of additional catalyst as required at regular intervals.

The crude product resulting from the polymerization or copolymerization process, in addition to containing the desired epihalohydrin polymer may contain residual unreacted monomer. This crude material is warmed and subjected to reduced pressure to vaporize off the unreacted monomer.

In the second step of the process the so prepared epihalohydrin polymer is dissolved along with the mercaptoalkanol and an alkali metal hydroxide in an inert diluent such as a lower alkyl alcohol such as methanol, ethanol, or isopropanol in which the metal halide salt which forms is insoluble, and the reaction mixture is heated at 25° to 150° C., preferably 40° to 90° C., the time required depending on the charge. The ratio of mercaptoalkanol to equivalents of chlorine is not critical and can vary from the amounts equivalent to the amount of halogen to be replaced or can be used in substantial excess so as to serve as a solvent. The amount of base used is ordinarily that required on an equivalent basis equal to the amount of halogen to be replaced. If the mercaptoalkanol is used on a basis equivalent to the amount of halogen to be replaced an excess of base may be used, although it is desirable not to use more than about a ten percent excess of base. Preferably the base and mercaptoalkanol used are the stoichiometric quantities required to displace the desired amount of halogen. The amount of halogen replaced can vary from 10–100% of theory. The amount of halogen replaced will depend on the properties desired in the end product. The reaction mixture is then filtered to remove the insoluble metal halide salt and the product recovered by vaporization or other convenient means for removal of the diluent.

The products of the present invention are, in general, viscous liquids substantially insoluble in water but readily soluble in many organic solvents including lower alkyl alcohols such as methanol, ketones such as acetone and chlorinated hydrocarbons such as methylenechloride. They are valuable resin intermediates because of their high functionality and their high reactivity. For example, the products of the present invention may be reacted with melamine to obtain useful thermoset resins and they may be reacted with polyisocyanates to produce polyurethane type resins and foams. The lack of readily hydrolyzable groups in such resins provides resins which exhibit excellent resistance to the action of water, acid, and alkalies. The epihalohydrin copolymer-mercaptoalkanol reaction products are useful as protective colloids for water soluble polymers such as polyvinyl alcohol.

The present invention is illustrated more particularly by way of the following examples, but as will be more apparent, is not limited to the details thereof.

Example 1

To a two liter three-necked flask fitted with a stirrer, Dry Ice condenser, dropping funnel, and a thermowell was charged 71.6 grams of ethylene glycol, 0.5 grams $H_3PO_2$ and 1.5 milliliters of $BF_3Et_2O$. A solution of 300 grams of epichlorohydrin (20 percent of total monomer charge) and 1200 grams of propylene oxide (80 percent of total monomer charge) was slowly added over a 20 hour period while the temperature was maintained below 30° C. An additional total of 4.5 grams of $BF_3 \cdot Et_2O$ and 1.8 grams of $H_3PO_2$ was added at regular intervals. The mixture was then evaporated under reduced pressure (10 mm.) to remove unreacted monomer. The final product which was a brown, viscous liquid, weighed 1325 grams, had a chlorine content of 6.7 percent and a chlorine equivalent weight of 530.

The copolymer was reacted with 2-mercapto-ethanol by charging 0.25 equivalent each of copolymer, 2-mercaptoethanol and sodium hydroxide with 85 grams of isopyropyl alcohol to a reaction flask and the mixture stirred at 60° C. for two hours. At the end of this period of time, the reaction mixture was filtered at reduced pressure and a tan colored liquid was recovered Titration of an aliquot of the sodium chloride filter cake indicated that displacement of the chlorine from the epichlorohydrin copolymer was essentially quantitative.

A polyurethane foam was prepared by mixing 13 grams of the above reaction product with 7 grams of a polyisocyanate having the general formula

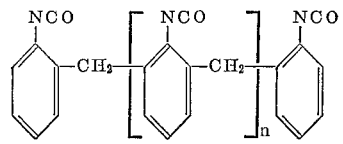

wherein $n$ is an average of approximately one, the product having an isocyanate equivalent (dibutylamine) of about 133.5 and a minimum NCO content by weight of 31 percent 7 grams monofluorotrichloromethane, 4 drops (approximately 0.2 gram) stannous octoate and 4 drops (approximately 0.2 gram) of a silicone oil cell size control agent in a paper cup and stirring the mixture until the reactants began to foam, whereupon a semirigid foam was produced.

A series of copolymers of epichlorohydrin with varying proportions by weight of propylene oxide were made following the above described procedure. Table I below lists the products made, their chlorine content and their chlorine equivalent weight.

TABLE I.—PERCENT OF TOTAL MONOMER CHARGE

| Sample No. | Epichlorohydrin | Propylene oxide | Percent chlorine | Chlorine equivalent, weight |
|---|---|---|---|---|
| A | 10 | 90 | 4.85 | 732 |
| B | 30 | 70 | 16.3 | 218 |
| C | 40 | 60 | 12.7 | 280 |

The epichlorohydrin copolymers listed in Table I were individually reacted with 2-mercaptoethanol following the procedure described above. The products were viscous liquids which ranged in color from light yellow to brown.

A polyurethane foam was prepared by mixing 13 grams of the reaction product of sample number B of Table I with 2-mercaptoethanol with 7 grams of the polyisocyanate prepolymer described above, 4-grams monofluorotrichloromethane, 2 drops (approximately 0.1 gram) stannous octoate and 4 drops of a silicone oil cell size control agent in a paper cup and stirring the mixture until the reactants began to foam whereupon a hard foam was produced.

In a manner similar to the procedure given in Example I, the following reactants were reacted.

Example 2

554 grams (.2 equivalents) of a copolymer of epichlorohydrin-ethylene oxide copolymer 25 moles epichlorohydrin to 75 moles of ethylene oxide)
156 grams (.2 eq.) 2-mercapto-ethanol
84 grams (2.1 eq.) sodium hydroxide
800 grams isopropyl alcohol The reaction gave a yield of 449 grams of a yellow, semi-viscous liquid which was soluble to the extent of 10% by weight in water. It was found that this resin could be used as a protective colloid or plasticizer for water soluble polymers such as polyvinyl alcohol.

Example 3

66.1 grams (0.5 equivalents) polyepichlorohydrin mol. weight about 450
40.8 g. (0.25 eq. 1-mercapto-3-butoxy-2-propanol
10.5 g. (0.26 eq.) sodium hydroxide
200 g. isopropyl alcohol The product was a clear, light brown free flowing liquid containing 7.65 sulfur and 9.3% hydroxyl. The yield of the product was 73 grams.

Example 4

98.9 g. (1.0 eq.) polyepichlorohydrin 1050 mol. weight
18.0 g. (0.1 eq.) 1-mercapto-3-butylthio-2-propanol
4.2 g. (0.105 eq.) sodium hydroxide
200 g. isopropyl alcohol The product was a very pale yellow, very viscous liquid containing 1.65% sulfur and 4.1% hydroxyl.

Example 5

49.5 g. (0.5 eq.) polyepichlorohydrin mol. weight 1050
11.5 g. (0.125 eq.) 1-mercapto-3-propanol
5.0 g. (0.125 eq.) sodium hydroxide
118.0 g. isopropyl alcohol The product was an off-white, very viscous liquid. The yield was 56.4.

Example 6

One equivalent each of 2-mercaptoethanol and NaOH was changed to a reaction flask together with 250 milliliters benzene and 150 milliliters ethanol and the materials reacted until 200 milliliters of the azeotropic diluent was removed at the azeotrope temperature. One equivalent of polyepichlorohydrin (92.5 grams) having a molecular weight of 450 dissolved in 100 milliliters of absolute ethanol was added to the reaction flask. The mixture was heated at reflux temperature for 4 hours, cooled and filtered to remove NaCl of which 0.9 equivalent was recovered. The remaining solution was evaporated under reduced pressure and viscous, tan oil was recovered.

A polyurethane foam was prepared by reacting 13 grams of the above reaction product with 14.1 grams of a polyisocyanate prepolymer formed from the reaction of oxypropylated glycerine with toluene diisocyanate, having a NCO content of 32 percent, 3 grams monofluorotrichloromethane, 3 drops (approximately 0.15 gram) stannous octoate and 4 drops of a silicone oil cell size control agent in a paper cup and stirring the mixture until the reactants began to from whereupon a rigid foam was produced.

Example 7

A series of copolymers of epichlorohydrin with varying proportions by weight of phenylglycidyl ether were made following the procedure of Example 1 with the exception that the diethylene glycol initiator was not incorporated in the reaction mixture. Table II below lists the products made with their chlorine equivalent weight.

TABLE II.—PERCENT OF TOTAL MONOMER CHARGE

| Sample No. | Epichlorohydrin | Phenylglycidyl ether | Percent Chlorine | Equivalent weight |
|---|---|---|---|---|
| 1 | 10 | 90 | 3.80 | 935 |
| 2 | 20 | 80 | 7.58 | 468 |
| 3 | 30 | 70 | 11.4 | 311 |
| 4 | 40 | 60 | 12.0 | 296 |

The epichlorohydrin copolymers listed in Table II were individually reacted with 2-mercaptoethanol following the procedure described above. The products were viscous liquids which ranged in color from light yellow to brown.

A film was prepared by mixing 10 grams of the reaction product of sample Number 2 of Table II with 2-mercaptoethanol with 2.5 grams of a polyisocyanate prepolymer formed from the reaction of oxypropylated glycerine with toluene diisocyanate, having an NCO content of 32 percent, and 3 drops (approximately 0.15 gram) of 2-dimethylaminoethanol. The mixture when spread on the surface of a steel panel and baked in an oven at 300° F. for 15 minutes cured to a clear, flexible hard film.

A film was also prepared by mixing 10 grams of the reaction product of sample Number 2 of Table II with 2-mercaptoethanol with 1.8 grams of Aerotex M-3, a partially methylated melamine formaldehyde condensate in the physical form of a clear viscous syrup at a concentration of 80 percent by weight of active ingredients. The syrup has a density of 10 pounds per gallon, a pH of 8.5–9 and is soluble in water in all proportions and 4 drops (approximately 0.2 gram) of Cyzac 1010, a solution of p-toluene sulfonic acid. The mixture when spread on the surface of a steel panel and baked in an oven for 10 minutes at 300° F. cured to a clear, flexible film having a pencil hardness between F and HB. When the procedure was repeated with 3.6 grams of Aerotex M-3, the cured film had a pencil hardness between 2H and 3H.

In place of epichlorohydrin as used in the preceding examples to prepare the compositions of the present invention there may be employed equivalent amount of other epihalohydrins such as epibromohydrin and epiiodohydrin as well as equivalent amounts of other alkylene oxides such as ethylene oxide, butylene oxide and the like, while otherwise the procedure is the same as described in said samples. Likewise equivalent amounts of other mercapto-alkanols such as 1-mercapto-2,3-propandiol, 1-mercapto-2-propanol, 1-mercapto-2-butanol, 1-mercapto-2-hexanol, 1-mercapto-3-propoxy-2-propanol, 1-mercapto-3-propylthio propanol, 1-mercapto-3-ethoxy-2-propanol, 1-mercapto-3-ethylthio-2-propanol, 1-mercapto-3-methoxy-2-propanol, 1-mercapto-3-octadecylthio-2-propanol, 1-mercapto-3-hexadecyloxy-2-propanol, and 1-mercapto-3-methylthio-2-propanol, may be reacted with the epihalohydrin polymers and copolymers to prepare the compositions of the present invention.

What is claimed is:

1. A composition of matter comprising the reaction product of (A) a mercapto-alkanol of the formula

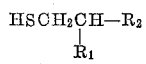
$$HSCH_2CH-R_2$$
$$|$$
$$R_1$$

wherein $R_1$ is selected from the group consisting of hydrogen and hydroxy, $R_2$ is selected from the group consisting of hydrogen, an alkyl group containing 1 to 4 carbon atoms, a hydroxymethyl group, an alkoxymethyl group containing 1 to 18 carbon atoms and an alkylthiomethyl group containing 1 to 18 carbon atoms with the proviso that at least one hydroxyl group is present on the molecule with (B) an epihalohydrin polymer selected from the group consisting of epihalohydrin homopolymers and epihalohydrin copolymers with an alkylene oxide, said reaction product being formed by reacting components (A) and (B) in an inert diluent in the presence of an alkali metal hydroxide at a temperature in the range of from 25 to 150° C.

2. The composition of claim 1 wherein the epihalohydrin is epichlorohydrin.

3. The composition of claim 1 wherein the alkylene oxide is propylene oxide.

4. The composition of claim 1 wherein the alkylene oxide is ethylene oxide.

5. The composition of claim 1 wherein the alkylene oxide is phenyl glycidyl ether.

6. The composition of claim 1 wherein the mercapto-alkanol is 2-mercaptoethanol.

7. The composition of claim 1 wherein the mercapto-alkanol is 3-mercaptopropanol.

8. The composition of claim 1 wherein the mercapto-alkanol is 1-mercapto-3-butoxy-2-propanol.

9. The composition of claim 1 wherein the mercapto-alkanol is 1-mercapto-3-butylthio-2-propanol.

10. A film comprising the reaction product of the composition of claim 1 with a melamine formaldehyde resin.

11. A polyurethane resin comprising the reaction product of the composition of claim 1 with a polyisocyanate.

References Cited

UNITED STATES PATENTS 2,472,471  6/1949  Eby _____ 260—609
2,129,709  9/1938  Schuette et al. _____ 260—609 X DONALD E. CZAJA, *Primary Examiner.*

C. W. IVY, *Assistant Examiner.*

U.S. Cl. X.R.

260—2, 77.5, 2.5, 79